(12) United States Patent
Kaneko et al.

(10) Patent No.: US 9,151,017 B2
(45) Date of Patent: Oct. 6, 2015

(54) WHEEL LOADER

(75) Inventors: Satoru Kaneko, Naka (JP); Takashi Ikimi, Hitachi (JP); Hidekazu Moriki, Hitachinaka (JP); Noritaka Ito, Ushiku (JP); Hiroaki Yanagimoto, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 127 days.

(21) Appl. No.: 13/983,635

(22) PCT Filed: Jan. 5, 2012

(86) PCT No.: PCT/JP2012/050127
§ 371 (c)(1),
(2), (4) Date: Aug. 5, 2013

(87) PCT Pub. No.: WO2012/114782
PCT Pub. Date: Aug. 30, 2012

(65) Prior Publication Data
US 2013/0317684 A1 Nov. 28, 2013

(30) Foreign Application Priority Data
Feb. 22, 2011 (JP) .................. 2011-036400

(51) Int. Cl.
*B60L 9/00* (2006.01)
*B60L 11/00* (2006.01)
(Continued)

(52) U.S. Cl.
CPC ............... *E02F 9/2075* (2013.01); *B60K 6/46* (2013.01); *B60W 10/06* (2013.01); *B60W 10/08* (2013.01);
(Continued)

(58) Field of Classification Search
CPC ..... E02F 9/2075; E02F 9/2079; E02F 9/2235; E02F 9/2296; B60W 20/108; B60W 50/087; B60W 10/08; B60W 10/30; B60W 30/18; B60W 10/06; B60W 2300/121; B60K 6/46; Y10S 903/93; Y02T 10/6286; Y02T 10/6217

USPC .......................................................... 701/22
See application file for complete search history.

(56) References Cited

U.S. PATENT DOCUMENTS

2010/0102767 A1* 4/2010 Endo et al. .................... 318/453
2011/0048827 A1* 3/2011 Cherney et al. .......... 180/65.245

FOREIGN PATENT DOCUMENTS

JP 2008-247269 10/2008
JP 2010-248870 11/2010

OTHER PUBLICATIONS

International Preliminary Report on Patentability, corresponding to international application No. PCT/JP2012/050127, mailed Sep. 6, 2013.

*Primary Examiner* — Calvin Cheung
*Assistant Examiner* — Paula L Schneider
(74) *Attorney, Agent, or Firm* — Baker Botts L.L.P.

(57) ABSTRACT

A hybrid wheel loader is provided, the hybrid wheel loader achieving high work efficiency even with a short supply of power to be output relative to a vehicle power requirement. The hybrid wheel loader includes a motor generator 6 connected to an engine (1), a hydraulic pump (4) connected to the motor generator, a hydraulic actuator (51, 52, 53) driven by hydraulic oil supplied from the hydraulic pump, a travel electric motor (9) for driving wheels (61), and an electrical storage device (11) connected to each of the motor generator and the electrical storage device via respective inverters (7, 10). When a total requirement power value is greater than a hybrid output upper limit value, either one of a hydraulic requirement power value Pf and a travel requirement power value Prun is limited according to an operation of the wheel loader to thereby set the total requirement power value to a value equal to, or less than, the hybrid output upper limit value.

6 Claims, 6 Drawing Sheets

(51) Int. Cl.
*G05D 1/00* (2006.01)
*G05D 3/00* (2006.01)
*G06F 7/00* (2006.01)
*G06F 17/00* (2006.01)
*E02F 9/20* (2006.01)
*E02F 9/22* (2006.01)
*B60W 20/00* (2006.01)
*B60W 50/08* (2012.01)
*B60W 10/06* (2006.01)
*B60W 10/08* (2006.01)
*B60W 10/30* (2006.01)
*B60W 30/18* (2012.01)
*B60K 6/46* (2007.10)

(52) U.S. Cl.
CPC .............. *B60W 10/30* (2013.01); *B60W 20/108* (2013.01); *B60W 30/18* (2013.01); *B60W 50/087* (2013.01); *E02F 9/2079* (2013.01); *E02F 9/2235* (2013.01); *E02F 9/2296* (2013.01); *B60W 2300/121* (2013.01); *Y02T 10/6217* (2013.01); *Y02T 10/6286* (2013.01); *Y10S 903/93* (2013.01)

FIG. 7

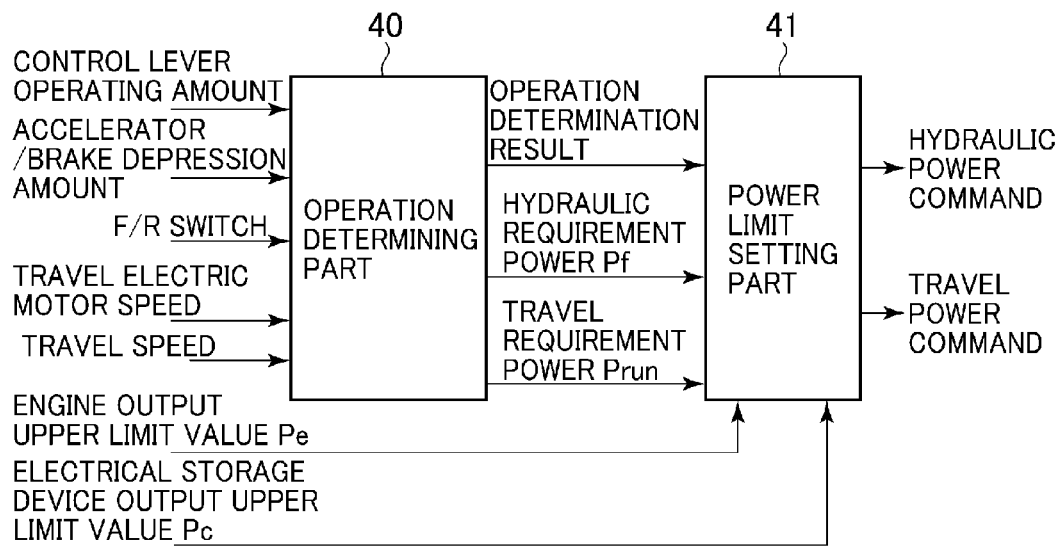

FIG. 8

| SPECIFIC OPERATION \ PART INFORMATION | CONTROL LEVER | ACCELERATOR /BRAKE | F/R SWITCH | TRAVEL ELECTRIC MOTOR SPEED | TRAVEL SPEED | POWER LIMITED |
|---|---|---|---|---|---|---|
| (1) COMBINED OPERATION | L≧L1 | A≧A1 | - | R>0 | V>0 (ACCELERATED) | TRAVEL REQUIREMENT POWER VALUE |
| (2-1) LEVEL GROUND EXCAVATION, FIRST HALF | L2>L | A≧A2 | FORWARD | R1≧R | V1≧V | HYDRAULIC REQUIREMENT POWER VALUE |
| (3-1) LEVEL GROUND EXCAVATION, SECOND HALF | L≧L2 (LIFT ARM RAISE) | A2>A | FORWARD | R2≧R | V2≧V | TRAVEL REQUIREMENT POWER VALUE |
| (2-2) SCOOPING UP FIRST-HALF | L2>L | A≧A2 | FORWARD | R1≧R (INVOLVING REVERSE) | V1≧V (INVOLVING REVERSE) | HYDRAULIC REQUIREMENT POWER VALUE |
| (3-2) SCOOPING UP SECOND-HALF | L≧L2 (LIFT ARM RAISE) | A2>A (BRAKE ON) | FORWARD | R2≧R (INVOLVING REVERSE) | V2≧V (INVOLVING REVERSE) | TRAVEL REQUIREMENT POWER VALUE |

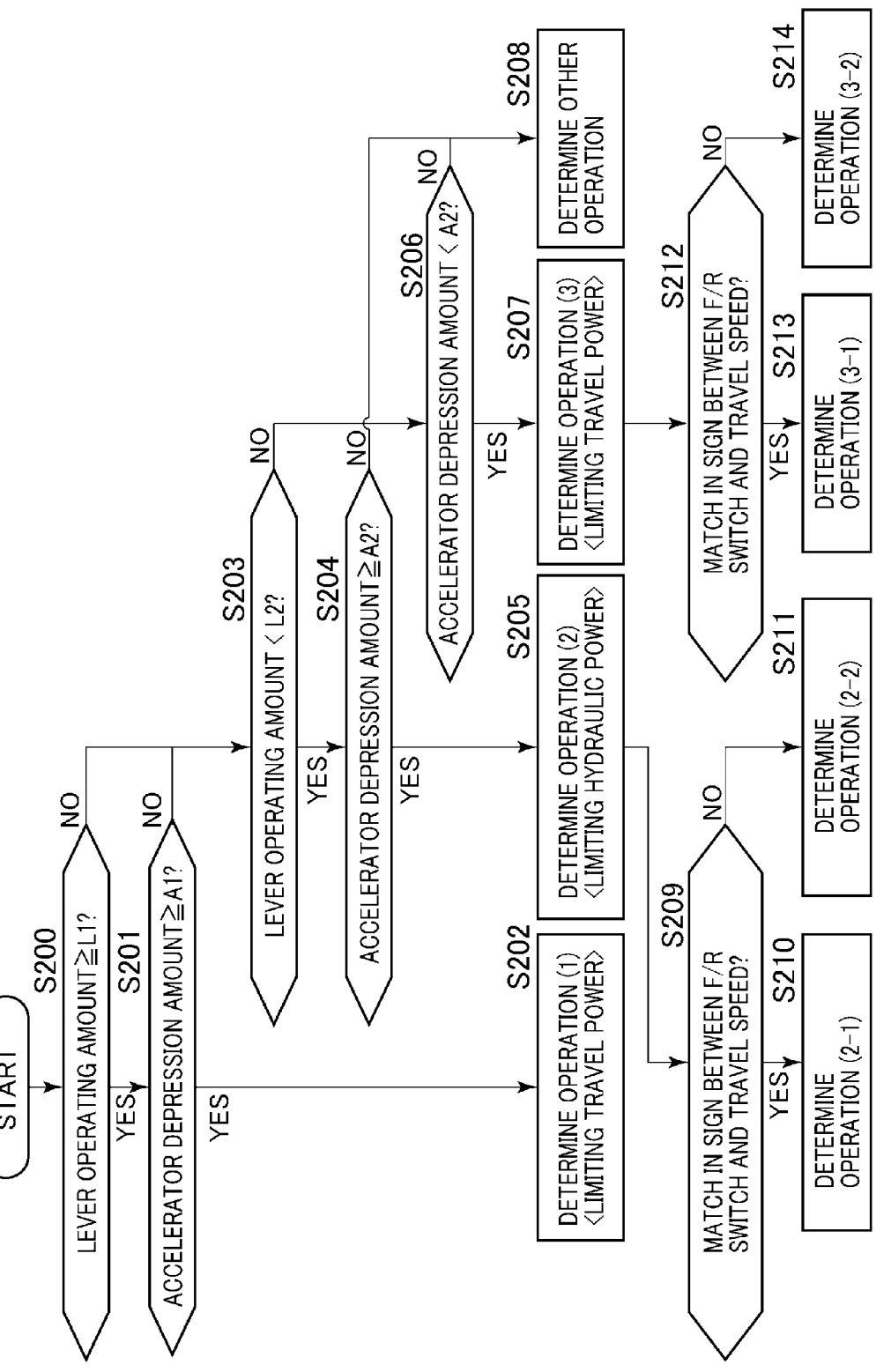

WHEEL LOADER

TECHNICAL FIELD

The present invention relates to a wheel loader including an engine and an electrical storage device as power sources.

BACKGROUND ART

In recent years, industrial products are more and more oriented toward energy saving from the viewpoints of, for example, environmental issues and soaring crude oil prices. This trend is also true with the field of construction and work vehicles that have so far mainly used hydraulic drive systems operated by diesel engines. Many of these vehicles are increasingly electrified to yield higher efficiency and consume less amounts of energy. For example, if the drive parts of the abovementioned construction and work vehicles are electrified, specifically, if electric motors are used for their drive sources, a number of energy-saving effects can be expected, such as driving of engines with high efficiency (for a hybrid model), improved power transmission efficiency, and recovery of regenerative electricity, in addition to reduced amounts of exhaust gases. In this field of construction and work vehicles, the electrification of forklift trucks is most advanced and what-is-called the "battery forklift trucks" that use electric power of a battery to drive a motor are put into practical use ahead of other types of vehicles and mainly compact forklift trucks are battery-powered. In even later years, following the battery forklift trucks, "hybrid vehicles" in which a diesel engine is combined with an electric motor begin to be available as commercial products in, for example, hydraulic excavators and engine-powered forklift trucks.

Among the construction and work vehicles that are being electrified in order to respond to environmental issues and energy-saving needs as described above, wheel loaders are expected to be a promising type of vehicle that, when hybridized, will yield a relatively significant effect of reduced fuel consumption. Conventional wheel loaders are a type of work vehicle that excavates and conveys, for example, earth and sand using a bucket portion of a work implement attached forwardly of the vehicle, while traveling along with power from an engine transmitted to its wheels via, for example, a torque converter and a transmission (T/M). Electrifying the Travel drive portion of such a wheel loader allows power transmission efficiency of the torque converter and transmission portion to be improved power transmission efficiency of electricity. In addition, the wheel loader repeatedly performs a traveling operation involving frequent starts and stops during working. If the travel drive portion is electrified, therefore, regenerative electric power during braking can be expected to be gained from the electric motor for traveling.

One known control method for a wheel loader hybrid system is disclosed in, for example, JP-2008-247269-A. The wheel loader disclosed in this document includes an engine and an electrical storage device as drive power sources. The wheel loader further includes a vehicular travel drive portion to which a hybrid drive system combining a motor generator, a planetary gear, and a transmission is applied. An engine speed is controlled based on an accelerator operation amount and an amount of charge of the electrical storage device, changeover of a shift speed of the transmission is controlled based on the accelerator operation amount, an operating condition of the motor generator, and a condition of charge of the electrical storage device, and torque to be generated in the engine and the motor generator is determined based on the accelerator operation amount, the travel speed, and the shift speed of the transmission.

PRIOR ART DOCUMENT

Patent Document

Patent Document 1
JP-2008-247269-A

SUMMARY OF THE INVENTION

Problem to be Solved by the Invention

One vehicle control method according to the technique disclosed in the abovementioned document is performed as follows. Specifically, if an overall vehicle torque requirement exceeds torque that can be generated by the engine, a travel torque command is calculated backward from setting values of engine torque and cargo-handling engine torque that are set in advance according to priority given to a travel system and a cargo-handling system (front work implement) and a motor generator torque command is also corrected accordingly.

In the above technique, however, the torque command of the motor generator and the travel torque command are calculated based on the torque of the motor generator to be driven using the electric power charged in the electrical storage device when the overall vehicle torque requirement exceeds torque that can be generated by the engine. If the electrical storage device is not charged with a reasonable amount of electric power, therefore, vehicle work efficiency may be reduced. Moreover, values of torque for different driving portions are set according to the predetermined priority. As a result, well-balanced work is not necessarily performed in all of various operating patterns of the wheel loader and reduced work efficiency may result in specific operating patterns.

It is an object of the present invention to provide a hybrid wheel loader including an electrified travel drive portion, the hybrid wheel loader being capable of performing vehicle control with high work efficiency even with a short supply of power to be output by a hybrid system relative to a vehicle power requirement due to, for example, discharge of electrical storage means.

Means for Solving the Problem

To achieve the foregoing object, an aspect of the present invention provides a wheel loader comprising: an engine; a motor generator connected to an output shaft of the engine; a hydraulic pump connected to a rotational shaft of the motor generator; at least one hydraulic actuator driven by hydraulic fluid supplied from the hydraulic pump; wheels; a travel electric motor for driving the wheels; an electrical storage device connected to each of the motor generator and the travel electric motor via respective inverters; and a controller for calculating a hybrid output upper limit value that represents a sum of output upper limit values of the engine and the electrical storage device, a hydraulic requirement power value required by the hydraulic pump, and a travel requirement power value required by the travel electric motor, wherein the controller limits either one of the hydraulic requirement power value and the travel requirement power value according to an operation of the wheel loader when a total requirement power value that represents a sum of the hydraulic requirement power value and the travel requirement power value is greater than the hybrid output upper limit value, thereby setting the total requirement power value to a value equal to, or less than, the hybrid output upper limit value.

Effects of the Invention

The present invention allows a hybrid wheel loader including an electrified travel drive portion to maintain high work efficiency even when an output upper limit of a hybrid system falls short of a power requirement required by the vehicle due to, for example, discharge of an electrical storage device.

BRIEF DESCRIPTION OF THE DRAWINGS

FIG. 7 is a diagram showing an input/output relation of an operation determining part and a power limit setting part in the embodiment of the present invention.

FIG. 8 is a matrix showing correspondence among basic operations of the wheel loader according to the embodiment of the present invention, input information used when a specific basic operation is to be detected, and power requirement values limited in the basic operation.

FIG. 10 is a flowchart showing detailed steps performed by the operation determining part 40 in the embodiment.

MODES FOR CARRYING OUT THE INVENTION

An embodiment of the present invention will be described below with reference to the accompanying drawings.

Figure 1:
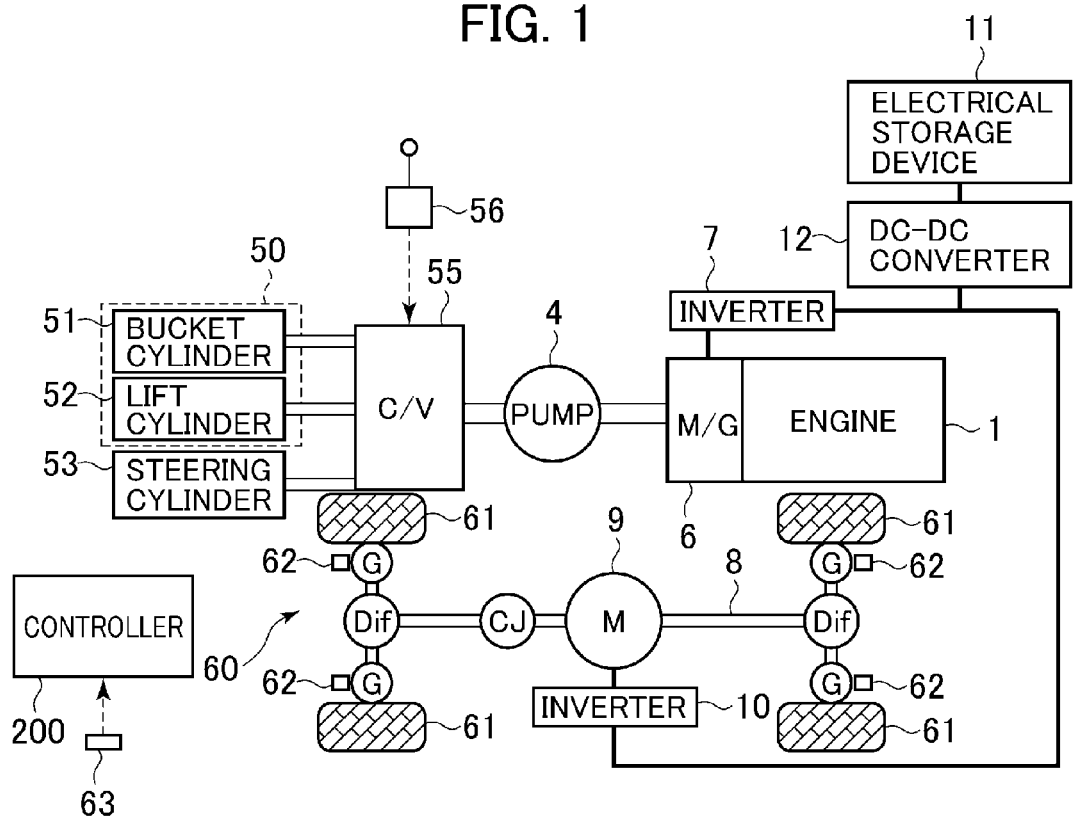
FIG. 1 is a system configuration diagram showing a hybrid wheel loader according to an embodiment of the present invention.

FIG. 1 is a system configuration diagram showing a hybrid wheel loader according to the embodiment of the present invention. The wheel loader shown in this figure includes an engine 1, a motor generator (motor/generator (M/G)) 6, an inverter 7, a hydraulic pump 4, a work implement 50, hydraulic actuators (a bucket cylinder 51, a lift cylinder 52, and a steering cylinder 53), a track structure 60, a travel electric motor 9, an inverter 10, an electrical storage device 11, operating devices (a control lever 56 and a steering wheel (not shown)), and a controller 200. Specifically, the motor generator 6 is connected to an output shaft of the engine 1. The inverter 7 controls the motor generator 6. The hydraulic pump 4 is connected to a rotational shaft of the motor generator 6. The work implement 50 includes a bucket and a lift arm (not shown) and is mounted forwardly of the vehicle. The hydraulic actuators are driven by hydraulic fluid supplied from the hydraulic pump 4 via a control valve 55. The track structure 60 has four wheels 61. The travel electric motor 9 is mounted on a propeller shaft 8 of the track structure 60 and drives the four wheels 61. The inverter 10 controls the travel electric motor 9. The electrical storage device 11 is electrically connected to the inverters 7, 10 via a DC-DC converter 12 to transfer DC electric power to or from the inverters 7, 10. The operating devices output operating signals for driving the hydraulic actuators 51, 52, 53 according to operating amounts.

The bucket cylinder 51 and the lift cylinder 52 are each driven based on an operating signal (hydraulic signal) output according to an operating amount of the control lever 56 disposed in a cab. The lift cylinder 52 is mounted on a lift arm rotatably fixed forwardly of the vehicle body. The lift cylinder 52 extends or contracts based on the operating signal from the control lever 56, thereby vertically rotating the lift arm. The bucket cylinder 51 is mounted on a bucket rotatably fixed to a leading end of the lift arm. The bucket cylinder 51 extends or contracts based on the operating signal from the control lever 56, thereby vertically rotating the bucket. The steering cylinder 53 is driven by an operating signal (hydraulic signal) output according to a steering amount of the steering wheel (not shown) disposed in the cab. The steering cylinder 53 is connected to each of the wheels 61 and extends or contracts based on the operating signal from the steering wheel, thereby changing a steering angle of the wheels 61.

Preferably, an electric double layer capacitor is used for the electrical storage device 11. The electrical storage device 11 according to the embodiment uses the DC-DC converter 12 to control an increase or a decrease in capacitor voltage, thereby transferring DC electric power to or from the inverters 7, 10 (specifically, the motor generator 6 and the travel electric motor 9).

The hybrid wheel loader having the arrangements as described above performs work according to its purpose by supplying the work implement 50 for excavating, for example, earth and sand with hydraulic pressure as appropriate using the hydraulic pump 4. A traveling operation of the track structure 60 is performed by driving the travel electric motor 9 using electric power generated by the motor generator 6 mainly with the power of the engine 1. At this time, the electrical storage device 11 stores regenerative electric power generated by the travel electric motor 9 during vehicle braking and supplies the motor generator 6 or the travel electric motor 9 with stored electric power to thereby assist the engine 1 in producing a power output, thus contributing to reduced energy consumption of the vehicle. It is noted that the hybrid system to which the present invention is applied is not limited to the exemplary configuration shown in FIG. 1 and the present invention can be applied to various system configurations including a parallel track type.

Figure 2:
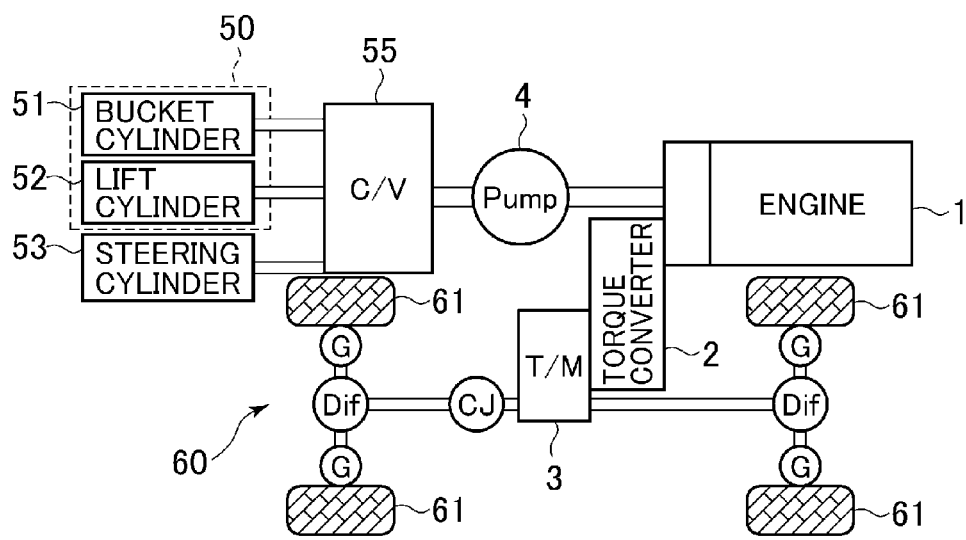
FIG. 2 is a diagram showing an exemplary configuration of a related-art wheel loader.

FIG. 2 is a diagram showing an exemplary configuration of a related-art wheel loader. In the figure, like or corresponding parts are identified by the same reference numerals as those used in the earlier figure and descriptions for those parts will not be duplicated (the same applies to subsequent figures). The related-art wheel loader shown in this figure includes a track structure 60 and a work implement 50 (lift/bucket portion) as main drive portions. The wheel loader travels along by transmitting power of an engine 1 to wheels 61 via a torque converter 2 and a transmission (T/M) 3. The wheel loader further excavates and conveys, for example, earth and sand using the work implement 50 driven by the hydraulic pump 4. The torque converter has a power transmission efficiency inferior to that of electricity. If a travel drive portion of the wheel loader shown in FIG. 2 is electrified (including modification to a parallel hybrid configuration), therefore, the power transmission efficiency from the engine 1 can be improved. Furthermore, the wheel loader repeatedly performs the traveling operation involving frequent starts and stops during working. If the travel drive portion is electrified, therefore, regenerative electric power during braking can be expected to be recovered from a travel electric motor 9. Electrifying part of the drive unit of the wheel loader to make a hybrid configuration as described above generally allows fuel consumption to be reduced by about several tens of percent.

Figure 3:
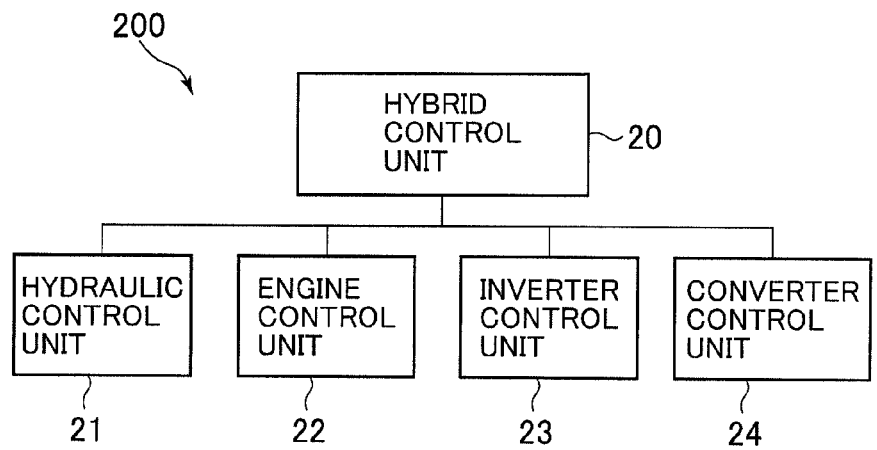
FIG. 3 is a configuration diagram showing a controller 200 mounted on the wheel loader according to the embodiment of the present invention.

FIG. 3 is a configuration diagram showing the controller 200 mounted on the wheel loader according to the embodiment of the present invention. As shown in this figure, the wheel loader (vehicle) according to the embodiment includes as the controller 200 a hybrid control unit 20, a hydraulic control unit 21, an engine control unit 22, an inverter control unit 23, and a converter control unit 24. Specifically, the hybrid control unit 20 controls, for example, an energy flow and a power flow of the entire hybrid system shown in FIG. 1. The hydraulic control unit 21 controls the control valve (C/V) 55 and the hydraulic pump 4. The engine control unit 22 controls the engine 1. The inverter control unit 23 controls the inverters 7, 10. The converter control unit 24 controls the DC-DC converter 12.

Each of the control units 20, 21, 22, 23, 24 includes a storage (e.g., RAM, ROM) (not shown) that stores details and results of processing and a processor (e.g., CPU) (not shown) that performs processing stored in the storage. The control units 20, 21, 22, 23, 24 are connected to each other via a controller area network (CAN), mutually transmitting and receiving command values and state quantities of the units. As shown in FIG. 3, the hybrid control unit 20 is a host to the hydraulic control unit 21, the engine control unit 22, the inverter control unit 23, and the converter control unit 24, generally controlling the entire system and giving a specific operating command to each of the control units 21 to 24 to ensure that the entire system exhibits the best possible working performance.

The control units 20, 21, 22, 23, 24 shown in FIG. 3 are only those required for controlling the various drive portions of the hybrid system shown in FIG. 1. Other control units for monitoring and information systems that are required to make an actual vehicle practical are not directly related to the present invention and thus not shown. Additionally, each of the control units 20, 21, 22, 23, 24 is not necessarily separate from each other as shown in FIG. 3 and two or more control functions may be mounted on a single control unit.

Figure 4:
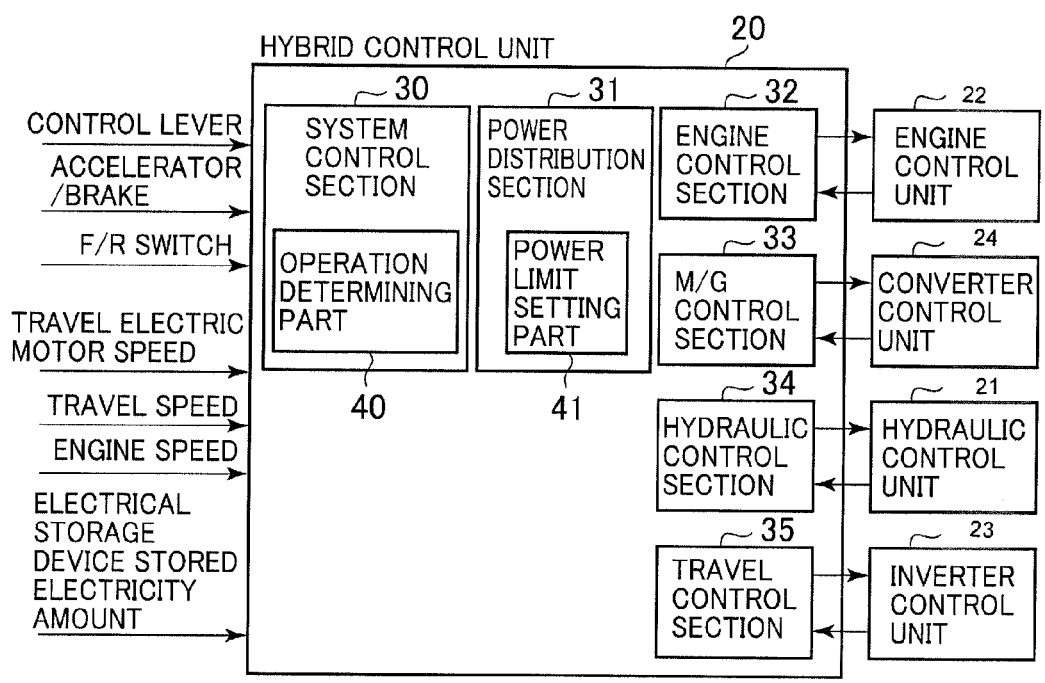
FIG. 4 is a diagram showing an exemplary configuration within a hybrid control unit 20 according to the embodiment of the present invention.

FIG. 4 is a diagram showing an exemplary configuration within the hybrid control unit 20 according to the embodiment of the present invention. The hybrid control unit 20 shown in this figure includes a system control section 30, a power distribution section 31, an engine control section 32, a M/G control section 33, a hydraulic control section 34, and a travel control section 35. Specifically, the system control section 30 generally controls the hybrid system. The power distribution section 31 distributes outputs from the engine 1 and the electrical storage device 11 to the hydraulic pump 4 and the travel electric motor 9. The engine control section 32 determines a speed command for the engine 1 according to a required power value (total requirement power value) in the entire vehicle that is obtained by adding a power value required by the hydraulic pump 4 (hydraulic requirement power value Pf) to a power value required by the travel electric motor 9 (travel requirement power value Prun). The M/G control section 33 determines a torque command for the motor generator 6 according to an electric power generation requirement value. The hydraulic control section 34 calculates a tilting angle command value of the hydraulic pump 4 from the hydraulic requirement power value Pf of the hydraulic pump 4 calculated from, for example, an operating amount of the control lever 56. The travel control section 35 calculates a torque command for the travel electric motor 9 from the travel requirement power value Prun calculated from depression amounts of the accelerator/brake pedals and the current travel speed.

The hybrid control unit 20 receives inputs of an operating signal output from the control lever 56, depression amounts of the accelerator pedal and the brake pedal disposed inside the cab, a switch signal (F/R signal) output from a F/R switch (selector) 63 for selecting a forward or reverse motion as the travel direction of the vehicle, the switch signal indicating the position (forward or reverse) of the switch, a travel speed calculated from a speed of the wheels 61 detected by a speed sensor (wheel speed detecting means) 62, a speed of the travel electric motor 9 output from the inverter 10, a speed of the engine 1 (engine speed), and a stored electricity amount of the electrical storage device 11 (terminal voltage and output current of the electrical storage device 11). It is noted that the speed of the wheel loader may be calculated by the hybrid control unit 20 using a detected value of the speed sensor 62.

As described above, the hybrid system according to the embodiment of the present invention includes the engine 1 and the electrical storage device 11 as the power sources for driving the vehicle. For the engine 1, the power to be output (engine output upper limit value Pe) is determined according to the engine speed that varies from one timing to another and, for the electrical storage device 11, the power to be output (electrical storage device output upper limit value Pc) is determined according to the stored electricity amount (charged condition) that varies from one timing to another. Specifically, the power to be output in the hybrid system is determined responsive to particular states.

Figure 5:
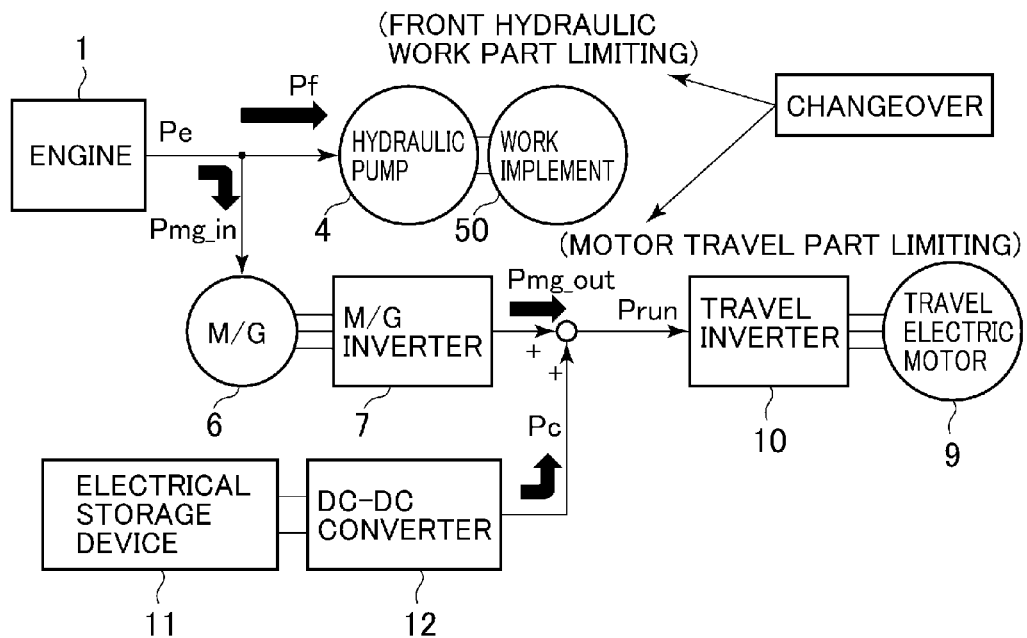
FIG. 5 is a diagram showing a power flow in a hybrid system according to the embodiment of the present invention.

FIG. 5 is a diagram showing a power flow in the hybrid system according to the embodiment of the present invention. As shown in this figure, the power distribution section 31 performs a process of distributing the engine output Pe and the electrical storage device output Pc to the output Pf of the work implement 50 and the output Prun of the travel electric motor 9. It is noted that Pmg_in and Pmg_out in expressions (1) and (2) given below denote input power and output power of the motor generator 6, respectively.

$$Pf = Pe - Pmg\_in \qquad \text{Expression (1)}$$

$$Prun = Pmg\_out + Pc \qquad \text{Expression (2)}$$

If a sum (total requirement power value) of the power value required by the work implement 50 (hydraulic requirement power value Pf) and the power value required by the travel electric motor 9 (travel requirement power value Prun) is smaller than a sum (hybrid output upper limit value) of the output upper limit values Pe, Pc, the hybrid control unit 20 causes the system control section 30 to determine a manner that provides the highest fuel consumption for output and, accordingly, causes the power distribution section 31 to issue a command value that meets the power requirement value of each of the work implement 50 and the travel electric motor 9, thereby operating the vehicle.

The wheel loader to which the present invention is applied has a number of basic operation patterns. The hybrid control unit 20 is required to operate the vehicle optimally according to each individual operation pattern. One of the most typical working patterns is, for example, V-cycle excavation work.

Figure 6:
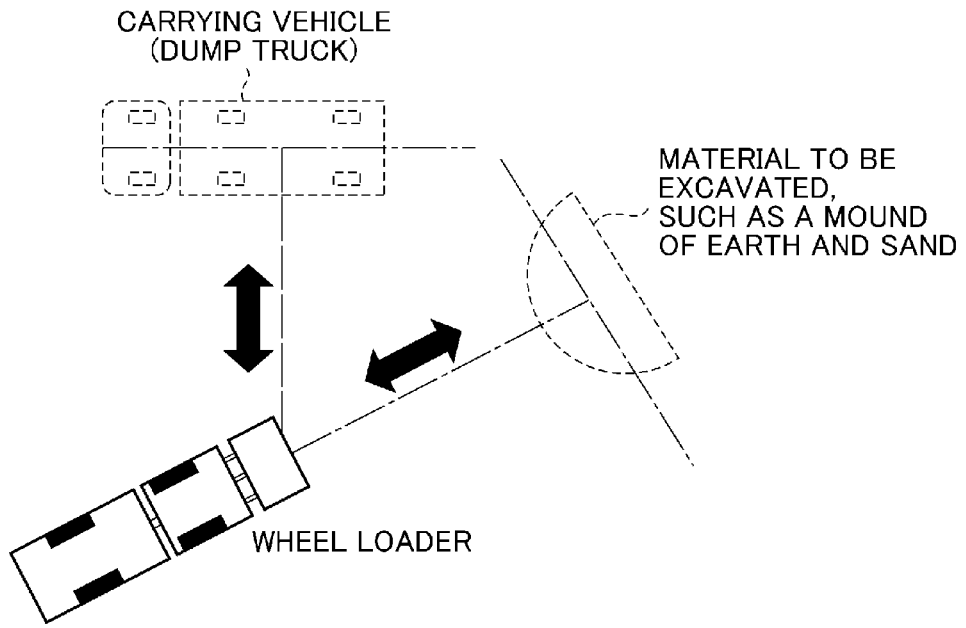
FIG. 6 is an illustration showing V-cycle excavation work as an exemplary work pattern of a wheel loader.

FIG. 6 is an illustration showing the V-cycle excavation work as an exemplary work pattern of the wheel loader. The V-cycle excavation work assumes a major operation pattern, accounting for about 70% or more of all of operations of the actual wheel loader. The wheel loader first advances into the object to be excavated, such as a mound of earth and sand, and then captures the object with its bucket while inserting the bucket. Next, reversing back to the original position, the wheel loader raises its lift arm and bucket, with its steering wheel being turned as necessary, and advances toward a carrying vehicle, such as a dump truck. After having dumped the object onto the carrying vehicle from the bucket, the wheel loader reverses again to return to the original position. Drawing a V-shaped trace as described above, the vehicle repeats these steps. When letting the hybrid wheel loader shown in FIG. 1 perform the sequence of operations described above, the hybrid control unit 20 distributes the outputs from the engine 1 and the electrical storage device 11 to the work implement 50 and the travel electric motor 9. The above is the control operation performed when the V-cycle excavation work as a standard operation pattern of the wheel loader is performed on the hybrid wheel loader shown in FIG. 1 as required by the requirement power value.

In the hybrid system according to the embodiment, however, if the electrical storage device 11 is in an over-discharge condition or the speed of the engine 1 is lower than a predetermined value, the total requirement power value (the sum of the hydraulic requirement power value Pf and the travel requirement power value Prun) may exceed the hybrid output upper limit value (the sum of the engine output upper limit value Pe and the electrical storage device output upper limit value Pc). If the electrical storage device 11 is a capacitor and a vehicle operation involves a relatively heavy load, in particular, the electric power is repeatedly output from the electrical storage device 11, so that a short supply of output of the hybrid system is likely to occur relative to the total requirement power value as described above.

Being a construction vehicle that performs excavation work using the work implement 50 mounted at the front portion thereof, while traveling along with the four wheels 61, the wheel loader performs a large variety of operations that vary according to external situations. As a result, the short supply of output of the hybrid system can affect work performance of the vehicle. For example, in a combined operation in which a lift arm raising operation in the work implement 50 and a vehicle starting operation are performed simultaneously (raising the lift arm, while moving the vehicle forward), raising the bucket to a required height is important before the vehicle reaches an intended location, even if the hybrid output upper limit value is lower than the total requirement power value. Thus, preferably, priority is given to the output to the work implement 50 as much as possible (specifically, the output to the travel electric motor 9 is limited).

In the hybrid wheel loader, the total requirement power value may exceed the hybrid output upper limit value due to the electrical storage device 11 being in an over-discharge condition or the engine speed being lower than a predetermined value, as described above. Even in such cases, preferably, the power is distributed optimally to each drive portion in the work implement 50 and the lower track structure 60 depending on specific operating details, thereby ensuring required work performance. In the hybrid wheel loader according to the embodiment, therefore, to enable such operations, the hybrid control unit 20 includes an operation determining part 40 and a power limit setting part 41 disposed thereinside.

FIG. 7 is a diagram showing an input/output relation of the operation determining part 40 and the power limit setting part 41 in the embodiment of the present invention. A configuration of the operation determining part 40 will be first described below. The operation determining part 40 receives inputs of information on operations and work of the vehicle, specifically, the operating mount of the control lever 56, the depression amounts of the accelerator pedal and the brake pedal, the switch signal from the F/R switch 63, the speed of the travel electric motor 9, and the travel speed. The operation determining part 40 determines, based on these pieces of information input thereto, the specific detail of the current operation of the wheel loader. The operation of the operation determining part 40 is related to the work performance of the entire vehicle and, preferably, disposed in the system control section 30 within the hybrid control unit 20 as shown in FIG. 4.

FIG. 8 is a matrix showing correspondence among basic operations of the wheel loader according to the embodiment of the present invention, input information used when a specific basic operation is to be detected, and power requirement values (travel requirement power value Prun/hydraulic requirement power value Pf) limited in the basic operation. Types of basic operations cited in the embodiment are mainly:

(Operation 1) Starting the vehicle and, at the same time, raising the lift arm (combined operation): Raising the lift arm, while starting the vehicle from a standstill position;

(Operation 2) Excavation: Causing the vehicle to advance into the object to be excavated, such as a mound of earth, to thereby load the bucket with earth and sand, or causing the vehicle to climb up a slope of the mound, while letting the bucket cut into part of the slope, to thereby load the bucket with earth and sand; and (Operation 3) Bucket scooping and dumping: Following the excavation (operation 2), raising the lift arm and tilting the bucket to scoop up earth and sand with the bucket and dumping to release the earth and sand.

The (operation 2) is further divided into:

(Operation 2-1) Level ground excavation first-half operation: Causing the bucket to cut into the object to be excavated, such as a mound of earth and sand, to thereby load the bucket with earth and sand; and (Operation 2-2) Scooping up first-half operation: Causing the vehicle to climb up a slope of the mound, while letting the bucket cut into part of the slope, to thereby load the bucket with earth and sand. The term "scooping up", as used herein, refers to the operation in which, while the wheel loader climbs up a slope of the mound of earth and sand, the bucket cuts into part of the slope.

Similarly, the (operation 3) is further divided into:

(Operation 3-1) Level ground excavation second-half operation: Causing the bucket to scoop up the earth and sand excavated in the level ground excavation first-half operation (operation 2-1) and dump to release the earth and sand; and (Operation 3-2) Scooping up second-half operation: Causing the bucket to scoop up the earth and sand filled therein in the scooping up first-half operation (operation 2-2) and dump to release the earth and sand. Specifically, the operations are divided into five specific types.

Understandably, the operations may be further subdivided, but any of these subtypes is similar to any of the above-described five types. Thus, these subtypes are considered to fall into any of the above five types.

A method for determining each of the basic three types of operations (operations 1, 2, and 3) will be described. These three types of operations can be basically determined with an operating amount L of the control lever 56 and a depression amount A of the accelerator pedal. Now, threshold values are to be set for the operating amount L of the control lever 56 and the depression amount A of the accelerator pedal. Specifically, let L1 be a first operating amount and L2 be a second operating amount, the first operating amount L1 being greater than the second operating amount L2 (L1>L2) and the first operating amount L1 being close to a maximum operating amount. Let A1 be a first depression amount and A2 be a second depression amount, the first depression amount A1 being greater than the second depression amount A2 (A1>A2) and the first depression amount A1 being close to a maximum depression amount. Similarly, threshold values are to be set for a travel speed B of the wheel loader and a rotational speed R of the travel electric motor 9. Specifically, let V1 be a first travel speed and V2 be a second travel speed, the first travel speed V1 being greater than the second travel speed (V1>V2) and the second travel speed V2 being close to zero (stationary state). Let R1 be a first rotational speed and R2 be a second rotational speed, the first rotational speed R1 being greater than the second rotational speed R2 (R1>R2) and the second rotational speed R2 being close to zero (stationary state).

In operation 1, the lift arm is raised, while the vehicle is started from a stationary state. This involves the control lever 56 being operated to a point close to the maximum operating amount (or to the very maximum operating amount) and the accelerator pedal being depressed to a point close to the maximum depression amount (or to the very maximum depression amount). The operation determining part 40 then determines that operation 1 is being performed when the operating amount of the control lever 56 is set to the first operating amount L1 or more and the depression amount of the accelerator pedal is set to the first depression amount A1 or more. When operation 1 is to be performed, the travel speed is accelerated from zero. From a viewpoint of making an even more accurate determination of operation, a change in the travel speed may further be detected to make the determination, in addition to the operating amount of the control lever 56 and the depression amount of the accelerator pedal.

Operation 2 involves capturing of, for example, earth and sand with the bucket. With an emptied bucket held in position and the lift arm held at a low level position, a large traction force (traveling drive power) is generated to make the vehicle advance into the mound of earth. Specifically, in operation 2, the operating amount of the control lever 56 is small and the depression amount of the accelerator pedal tends to be smaller than that in operation 1, but is relatively large. Thus, the operation determining part 40 determines that operation 2 is being performed when the operating amount of the control lever 56 is set to be smaller than the second operating amount L2 and the depression amount of the accelerator pedal is set to be smaller than the first depression amount A1 and the second depression amount A2 or more. During operation 2, the travel speed is low or zero and the F/R switch 63 is in the forward position. From the viewpoint of making an even more accurate determination of operation, a change in the travel speed and the position of the F/R switch 63 may further be detected, in addition to the operating amount of the control lever 56 and the depression amount of the accelerator pedal, and the determination may be made that operation 2 is being performed when the travel speed is V1 or less and the F/R switch 63 is placed in the forward position.

In operation 3, the lift arm is raised, while the bucket loaded with, for example, earth and sand in operation 2 is tilted and the bucket is dumped at a required position to release the earth and sand. Specifically, in operation 3, the control lever 56 is operated in a direction in which the lift cylinder 52 is extended (a direction in which the lift arm) and the vehicle is held is a substantially stationary state. Then, the operation determining part 40 determines that operation 3 is being performed when the operating amount of the control lever 56 is set to be smaller than the first operating amount L1 and the second operating amount L2 or more and the depression amount of the accelerator pedal is set to be smaller than the second depression amount A2 after the determination that operation 2 is performed has been made. Instead of the foregoing, operation 3 may be determined to be being performed, if the control lever 56 is operated in a direction in which the lift arm is raised after the determination that operation 2 is performed has been made. Alternatively, when operation 3 is to be performed, the travel speed is nearly zero and the F/R switch 63 is placed in the forward position. Thus, from the viewpoint of making an even more accurate determination of operation, a change in the travel speed and the position of the F/R switch 63 may further be detected, in addition to the operating amount of the control lever 56 and the depression amount of the accelerator pedal, and the determination may be made that operation 3 is being performed when the travel speed is V2 or less and the F/R switch 63 is placed in the forward position.

Cases in which operation 2 needs to be subdivided into two sub-operations (operation 2-1 and operation 2-2) will be described below. Unlike the level ground excavation first-half operation (operation 2-1), the scooping up first-half operation (operation 2-2) is excavation work performed on a slope. As a result, during the scooping up first-half operation, the vehicle body tends to be temporarily reversed despite the "forward" position in which the F/R switch 63 is placed; specifically, a situation develops in which the vehicle body is moved in a direction different from the position of the F/R switch 63. In this embodiment, therefore, a sign of the travel speed and a sign of a switch signal of the F/R switch 63 are detected and it is thereby determined whether the vehicle body is reversed despite the position of the F/R switch 63. It is noted that the sign of the travel speed is positive when the vehicle body moves forward and negative when the vehicle body moves backward. In addition, the sign of the switch signal is positive when the F/R switch 63 is placed in the forward position and negative when the FIR switch 63 is placed in the reverse position. Thus, the operation determining part 40 may determine that the scooping up first-half operation (operation 2-2) is being performed and the wheel loader is operating on a slope, when, with the determination made that operation 2 is being performed, there is a mismatch between the sign of the switch signal output from the F/R switch 63 and the sign of the travel speed. In contrast, if there is a match between the signs, the operation determining part 40 determines that the level ground excavation first-half operation (operation 2-1) is being performed and the wheel loader is operating on a flat ground.

Cases in which operation 3 needs to be subdivided into two sub-operations (operation 3-1 and operation 3-2) will be described below. The scooping up second-half operation (operation 3-2) is performed on a slope as in the scooping up first-half operation. If the scooping up second-half operation needs to be differentiated from the level ground excavation second-half operation (operation 3-1), therefore, the sign of the travel speed and the position in which the F/R switch 63 is placed (sign of the switch signal) only need to be detected similar to operation 2. The scooping up second-half operation is further characterized in that the operation is set when the brake pedal is depressed to prevent the vehicle from being reversed. Thus, the operation determining part 40 may determine that the scooping up second-half operation is being performed when, with the determination made that operation 3 is being performed, the brake pedal is detected to be depressed in addition to a mismatch between the position (forward) in which the F/R switch 63 is placed and the direction of the travel speed.

As described above, the operation determining part 40 determines the specific operation performed by the hybrid wheel loader based on the input information shown in FIG. 8.

It is noted that, while the travel speed is in some cases used for determining the operation, the operation may nonetheless be determined based on the criteria shown in FIG. 8 by detecting the speed of the travel electric motor 9, instead of the travel speed.

In FIG. 7, the power limit setting part 41 limits either the hydraulic requirement power value Pf or the travel requirement power value Prun to thereby cause the total requirement power value to fall within the hybrid output upper limit value according to the result of the determination made by the operation determining part 40, when the total requirement power value is greater than the hybrid output upper limit value. The power limit setting part 41 receives inputs of the specific operation determined by the operation determining part 40, the hydraulic requirement power value Pf and the travel requirement power value Prun output from the operation determining part 40, the engine output upper limit value Pe calculated from the engine speed, and the electrical storage device output upper limit value Pc (capacitor output) calculated from the amount of electric power stored in the electrical storage device 11. The power limit setting part 41 in the embodiment is disposed in the power distribution section 31 in the hybrid control unit 20.

The rightmost column of FIG. 8 shows a specific type of power to be limited by the power limit setting part 41, associated with a result of the determination made by the operation determining part 40. Specifically, (Operation 1): travel requirement power value Prun;
(Operation 2): hydraulic requirement power value Pf; and
(Operation 3): travel requirement power value Prun. From the viewpoint of improved work efficiency, preferably, priority is given to the hydraulic requirement power value Pf in operation 1 and operation 3, and to the travel requirement power value Prun in operation 2.

For example, if the total requirement power value is greater than the hybrid output upper limit value while operation 1 is being performed, the power limit setting part 41 calculates a difference between the total requirement power value and the hybrid output upper limit value (a shortage) and, by subtracting the shortage from the travel requirement power value Prun, sets a new travel requirement power value Prun so that the total requirement power value falls within the hybrid output upper limit value.

Figure 9:
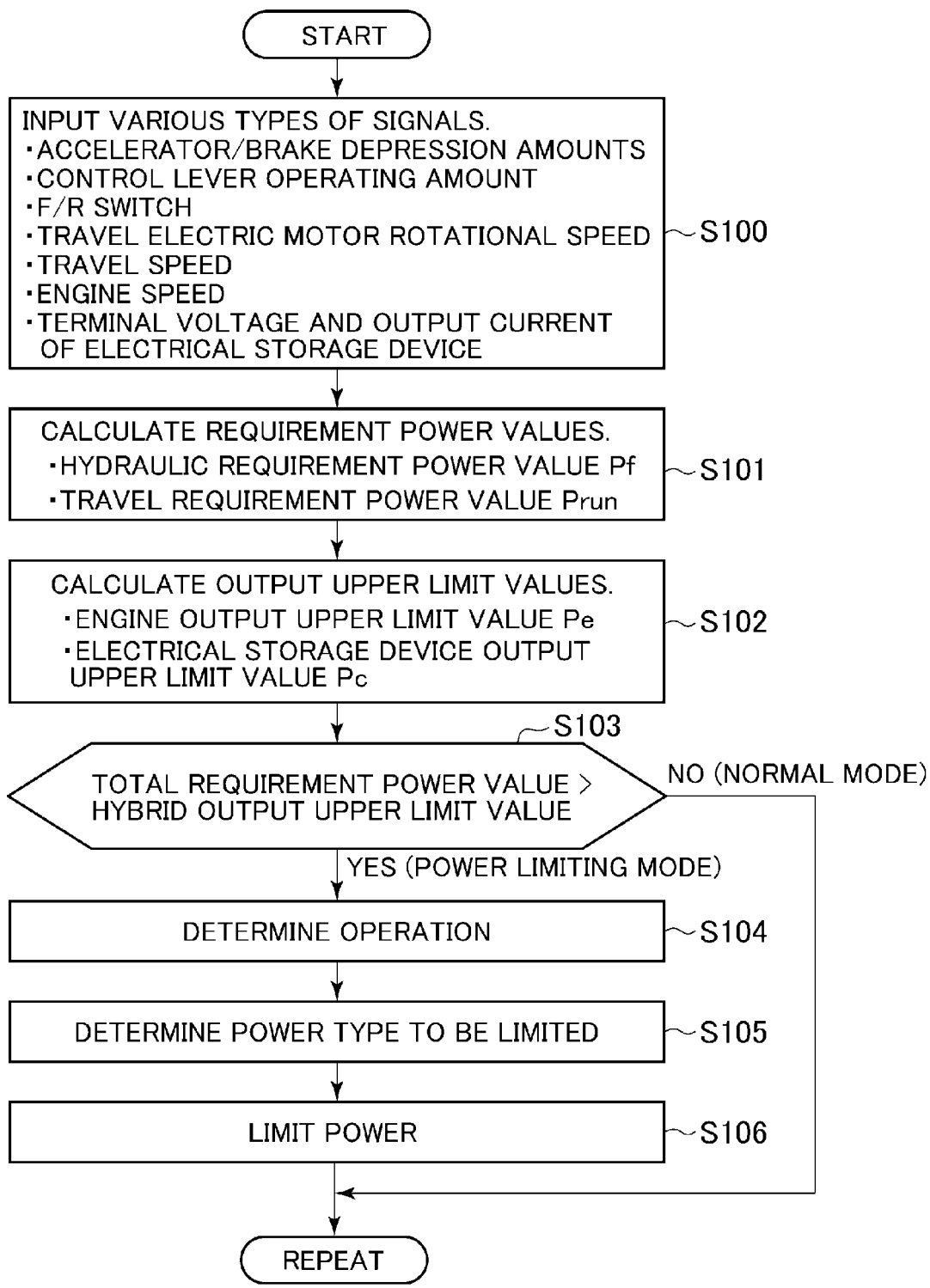
FIG. 9 is a flowchart showing steps performed by the operation determining part 40 and the power limit setting part 41 in the embodiment.

Specific steps to be performed by the operation determining part 40 and the power limit setting part 41 will be described below with reference to the accompanying drawings. FIG. 9 is a flowchart showing steps performed by the operation determining part 40 and the power limit setting part 41 in the embodiment. As shown in the figure, the operation determining part 40 first receives inputs of various types of signals (S100).

Based on the depression amounts of the accelerator pedal and the brake pedal and the operating amount of the control lever 56, the operation determining part 40 calculates the hydraulic requirement power value Pf and the travel requirement power value Prun (S101). In S102, the hybrid control unit 20, receiving inputs of the engine speed, and the terminal voltage and output current of the electrical storage device 11, calculates the engine output upper limit value Pe and the electrical storage device output upper limit value Pc.

In S103, the power limit setting part 41 compares the total requirement power value that is the sum of the hydraulic requirement power value Pf and the travel requirement power value Prun with the hybrid output upper limit value that is the sum of the engine output upper limit value Pe and the engine output upper limit value Pe. If the total requirement power value exceeds the hybrid output upper limit value, the process shifts to a power limiting mode and proceeds to S104.

In S104, the operation determining part 40 determines whether the current specific operation of the vehicle falls into operation 1, operation 2, or operation 3 based on the signals applied thereto in S100. The specific operation is here determined based on the criteria shown in FIG. 8 described earlier. Specifically, the operation is determined based on the flowchart shown in FIG. 10.

FIG. 10 is a flowchart showing detailed steps performed by the operation determining part 40 in the embodiment. As shown in this figure, the operation determining part 40 first compares the current lever operating amount with the setting value L1 (S200) and then compares the current accelerator depression amount with the setting value A1 (S201). If, as a result, the lever operating amount is equal to, or more than, the setting value L1 and the accelerator depression amount is equal to, or more than, the setting value A1, the operation determining part 40 determines operation (1) in S202 and the process proceeds to S105 (FIG. 9).

If it is determined in S200 or S201 that either the lever operating amount or the accelerator depression amount is less than the setting value L1 or A1, the lever operating amount is compared with the setting value L2 in S203. If the lever operating amount is less than the setting value L2, the accelerator depression amount is compared with the setting value A2 in S204. If, as a result, the accelerator depression amount is equal to, or more than, the setting value A2, the operation determining part 40 determines operation (2) in S205 and performs S105.

In the above step of determining operation (2), if the lever operating amount is equal to, or more than, the setting value L2 in S203, the process proceeds to S206 and the accelerator depression amount is compared with the setting value A2. If, as a result, the accelerator depression amount is less than the setting value A2, the operation determining part 40 determines operation (3) in S207 and the process proceeds to S105.

If the accelerator depression amount is less than the setting value A2 in S204 (specifically, lever operating amount<L2 and accelerator depression amount<A2), and the accelerator depression amount is equal to, or more than, the setting value A2 in S206 (specifically, lever operating amount≥L2 and accelerator depression amount≥A2), the lever operating amount and the accelerator depression amount are considered to be operated at an identical ratio and the operation determining part 40 determines other operation in S208. In this case, output priority is not set between the hydraulic requirement power value and the travel requirement power value in S105 and the output only needs to be limited at the identical ratio in S106.

It is noted that, after the steps of S205 and S207 have been performed, a step may be performed to determine a match between the sign of the switch signal of the F/R switch 63 and the sign of the current travel speed (sign of a detected value of the travel speed) (S209, S212) before performance of S105. If there is a match between the sign of the switch signal and the sign of the current travel speed in S209, operation (2-1) is determined in S210. In contrast, if a mismatch occurs between the two signs, the vehicle is determined to be reversed on a slope and operation (2-2) is determined in S211. If there is a match between the two signs in S212, operation (3-1) is determined in S213. In contrast, if a mismatch occurs between the two signs, the vehicle is determined to be reversed on a slope and operation (3-2) is determined in S214.

As noted, operation (2) and operation (3) are each subdivided into the level ground work and the scooping up work. This is because, during the scooping up work, in particular, shortage of the output of the travel electric motor 9 can result from power distribution, resulting in the vehicle being reversed, despite the F/R switch 63 being placed in the forward position. Specifically, if it is determined that the reversal of the vehicle (mismatch in sign between the switch signal and the travel speed) occurs, preferably, control is performed so that, while the travel requirement power value is increased by a requirement for preventing the vehicle from being reversed (specifically, a requirement for causing the vehicle to advance or remain stationary), the hydraulic requirement power value is limited by the increase of the travel requirement power value, in addition to the limiting of the hydraulic requirement power value or the travel requirement power value performed in S205 or S207. Specifically, if operation (2-2) or (3-2) is determined, a power value required for avoiding the reversal is added to the travel requirement power value determined in S205 and S207, and a power value corresponding to the power value required for avoiding the reversal is subtracted from the hydraulic requirement power value determined in S205 and S207. The control performed as described above prevents the vehicle from being reversed during the scooping up work, thus improving work efficiency during the scooping up work.

Referring back to FIG. 9, the specific type of power to be limited is determined in S105 based on the specific operation determined in S104. The determination is here made based on the combination shown in FIG. 8. When the specific type of power to be limited is determined in S105, a step is performed to limit the power in S106. The power limiting step to be here performed may include, for example, calculating a difference between the total requirement power value and the hybrid output upper limit value and subtracting the power equivalent to the thus-obtained difference from the specific type of power to be limited determined in S105. When the power limiting step is completed, the process returns to S100 and the steps from S100 and onward are repeated. If it is determined in S103 that the hybrid output upper limit value exceeds the total requirement power value, the process is terminated as a normal mode and the steps of S100 and onward are repeated.

The foregoing process allows the drive portion to which the power is preferentially distributed to be determined according to the specific operation performed by the wheel loader even in shortage of output of the vehicle (e.g., the work implement 50 is heavily loaded or the voltage of the electrical storage device 11 falls below a set value and is in a discharged state (specifically, the electrical storage device 11 has a short amount of electric power stored therein)). The process thereby permits optimum allotment of the driving force to the thus-determined drive portion, making the most of vehicle work characteristics. Thus, the embodiment can maintain high work efficiency even when the hybrid output upper limit value is smaller than the total requirement power value due to, for example, discharge of the electrical storage device.

DESCRIPTION OF REFERENCE NUMERALS

1 Engine
2 Torque converter
3 Transmission (T/M)
4 Hydraulic pump
6 Motor/generator (M/G)
7 Inverter
8 Propeller shaft
9 Travel electric motor
10 Inverter
11 Electrical storage device
12 DC-DC converter
20 Hybrid control unit
21 Engine control unit
22 Converter control unit
23 Hydraulic control unit
24 Inverter control unit
30 System control unit
31 Power distribution section
32 Engine control section
33 M/G control section
34 Hydraulic control section
35 Travel control section
40 Operation determining part
41 Power limit setting part
50 Work implement
60 Track structure
61 Wheel
200 Controller
Pf Hydraulic requirement power value
Prun Travel requirement power value
Pe Engine output upper limit value
Pc Electrical storage device output upper limit value

The invention claimed is:

1. A wheel loader comprising:
an engine;
a motor generator connected to an output shaft of the engine;
a hydraulic pump connected to a rotational shaft of the motor generator;
at least one hydraulic actuator driven by hydraulic oil supplied from the hydraulic pump;
wheels;
a travel electric motor for driving the wheels;
an electrical storage device connected to each of the motor generator and the travel electric motor via respective inverters;
an operating device for outputting an operating signal that drives the hydraulic actuator according to an operating amount;
an accelerator pedal for controlling a speed of the engine;
a brake pedal for controlling a brake unit of the wheels; and
a controller for calculating an engine output upper limit value based on the speed of the engine, an electrical storage device output upper limit value based on an amount of electric power stored in the electrical storage device, a hydraulic requirement power value required by the hydraulic pump based on the operating amount of the operating device, and a travel requirement power value required by the travel electric motor based on depression amounts of the accelerator pedal and the brake pedal, and a travel speed,
wherein the controller limits either one of the hydraulic requirement power value and the travel requirement power value according to an operation of the wheel loader upon determining a total requirement power value that represents a sum of the hydraulic requirement power value and the travel requirement power value is greater than a hybrid output upper limit value that represents a sum of the engine output upper limit value and the electrical storage device output upper limit value, thereby setting the total requirement power value to a value equal to, or less than, the hybrid output upper limit value, and
wherein the controller determines a specific operation being performed by the wheel loader based on the operating amount of the operating device and the depression amount of the accelerator pedal and, according to a result of the determination thus made, determines which one of the hydraulic requirement power and the travel requirement power should be limited.

2. The wheel loader according to claim 1, wherein by having a first operating amount set in the operating amount of the operating device and a first depression amount set in the depression amount of the accelerator pedal, the controller limits the travel requirement power value, when the total requirement power value being greater than the hybrid output upper limit value, if the operating amount of the operating device is equal to, or more than, the first operating amount and the depression amount of the accelerator pedal is equal to, or more than, the first depression amount.

3. The wheel loader according to claim 2, wherein by having a second operating amount smaller than the first operating amount set in the operating amount of the operating device and a second depression amount smaller than the first depression amount set in the depression amount of the accelerator pedal, the controller limits the hydraulic requirement power value, when the total requirement power value being greater than the hybrid output upper limit value, if the operating amount of the operating device is less than the second operating amount and the depression amount of the accelerator pedal is less than the first depression amount and equal to, or more than, the second depression amount.

4. The wheel loader according to claim 3, further comprising:
means for detecting a travel speed of the wheel loader; and
a selector for selecting a forward or reverse motion as a travel direction of the wheel loader,
wherein when the wheel loader is being reversed as determined via a detected value of the travel speed detecting means despite a selection made with the selector of the forward motion as the travel direction of the wheel loader, the controller, while increasing the travel requirement power value by a requirement for preventing the wheel loader from being reversed, limits the hydraulic requirement power value by the increase of the travel requirement power value, in addition to the limiting of the hydraulic requirement power value or the travel requirement power value performed when the total requirement power value is greater than the hybrid output upper limit value.

5. The wheel loader according to claim 2, wherein by having a second operating amount smaller than the first operating amount set in the operating amount of the operating device and a second depression amount smaller than the first depression amount set in the depression amount of the accelerator pedal, the controller limits the travel requirement power value, when the total requirement power value being greater than the hybrid output upper limit value, if the operating amount of the operating device is less than the first operating amount and equal to, or more than, the second operating amount and the depression amount of the accelerator pedal is less than the second depression amount.

6. The wheel loader according to claim 5, further comprising:
means for detecting a travel speed of the wheel loader; and
a selector for selecting a forward or reverse motion as a travel direction of the wheel loader,
wherein when the wheel loader is being reversed as determined via a detected value of the travel speed detecting means despite a selection made with the selector of the forward motion as the travel direction of the wheel loader, the controller, while increasing the travel requirement power value by a requirement for preventing the wheel loader from being reversed, limits the hydraulic requirement power value by the increase of the travel requirement power value, in addition to the limiting of the hydraulic requirement power value or the travel requirement power value performed when the total requirement power value is greater than the hybrid output upper limit value.

* * * * *